(12) United States Patent
Momoh

(10) Patent No.: US 10,633,114 B2
(45) Date of Patent: Apr. 28, 2020

(54) SYSTEM AND METHOD FOR PROTECTION OF ELECTRONIC BOX UNDER LIGHTNING STRIKE

(71) Applicant: James Momoh, Upper Marlboro, MD (US)

(72) Inventor: James Momoh, Upper Marlboro, MD (US)

(73) Assignee: HOWARD UNIVERSITY, Washington, DC (US)

( * ) Notice: Subject to any disclaimer, the term of this patent is extended or adjusted under 35 U.S.C. 154(b) by 0 days.

(21) Appl. No.: 16/060,249

(22) PCT Filed: Dec. 6, 2016

(86) PCT No.: PCT/US2016/065152
§ 371 (c)(1),
(2) Date: Jun. 7, 2018

(87) PCT Pub. No.: WO2017/100192
PCT Pub. Date: Jun. 15, 2017

(65) Prior Publication Data
US 2018/0362186 A1 Dec. 20, 2018

Related U.S. Application Data

(60) Provisional application No. 62/264,083, filed on Dec. 7, 2015.

(51) Int. Cl.
*B64F 1/20* (2006.01)
*G08G 5/00* (2006.01)
(Continued)

(52) U.S. Cl.
CPC .............. *B64F 1/20* (2013.01); *G08G 5/0026* (2013.01); *G08G 5/025* (2013.01); *H02H 9/005* (2013.01);
(Continued)

(58) Field of Classification Search
CPC ..... B64F 1/20; F21W 2111/06; G08G 5/0026; G08G 5/025; H02G 13/60; H02H 9/005;
(Continued)

(56) References Cited

U.S. PATENT DOCUMENTS 3,858,088 A * 12/1974 Scarpino .................. H02H 7/20
315/200 A
4,271,446 A * 6/1981 Comstock .............. H02H 9/042
340/638
(Continued)

OTHER PUBLICATIONS

International Search Report and Written Opinion of PCT/US2016/065152, dated Feb. 24, 2017, p. 1-6.

*Primary Examiner* — Stephen R Burgdorf
(74) *Attorney, Agent, or Firm* — Sughrue Mion, PLLC

(57) ABSTRACT

An airport lighting system includes one or more lighting elements, a transient protection apparatus, and one or more electrical control cabinets. The transient protection apparatus is coupled to the one or more lighting elements. One or more electrical control cabinets are coupled to the transient protection apparatus. Each of the control cabinets produces one or more of control and power signals that are effective to operate the one or more lighting elements. The transient protection apparatus is configured to provide protection for one or more of the electrical control cabinets and the one or more lighting elements from electrical surges.

15 Claims, 9 Drawing Sheets

(51) Int. Cl.
  *G08G 5/02* (2006.01)
  *H02H 9/00* (2006.01)
  *H02H 9/04* (2006.01)
  *H05B 37/03* (2006.01)
  *F21W 111/06* (2006.01)
(52) U.S. Cl.
  CPC ............ *H02H 9/041* (2013.01); *H05B 37/03* (2013.01); *F21W 2111/06* (2013.01)
(58) Field of Classification Search
  CPC .......... H02H 9/04; H02H 9/041; H02H 9/042; H02H 9/08; H05B 33/08115; H05B 33/0887; H05B 33/089; H05B 37/02; H05B 37/03; H05B 39/08
  USPC ........................................................ 340/953
  See application file for complete search history.

(56) References Cited

U.S. PATENT DOCUMENTS

| | | | | |
|---|---|---|---|---|
| 4,584,622 A * | 4/1986 | Crosby | .................. | H02H 9/005 361/111 |
| 4,807,083 A * | 2/1989 | Austin | .................... | H02H 9/04 361/104 |
| 5,327,316 A * | 7/1994 | Yi | .......................... | H02H 9/005 361/111 |
| 5,335,160 A * | 8/1994 | Savoca | .................... | H02G 7/20 174/38 |
| 5,485,151 A * | 1/1996 | Runyon | ............. | H05B 37/0227 315/130 |
| 5,532,897 A * | 7/1996 | Carpenter, Jr. | ......... | H02H 9/044 361/111 |
| 5,926,115 A | 7/1999 | Schleder et al. | | |
| 5,969,642 A | 10/1999 | Runyon et al. | | |
| 6,122,157 A * | 9/2000 | Gerlach | ................. | H05K 5/064 361/111 |
| 6,304,188 B1 * | 10/2001 | Subak | ................ | H01R 13/6666 340/635 |
| 6,477,025 B1 * | 11/2002 | Goldbach | .............. | H02H 9/042 337/159 |
| 6,870,442 B1 * | 3/2005 | Suzuki | ..................... | H04B 1/52 333/103 |
| 7,106,572 B1 * | 9/2006 | Girard | .................... | H02H 9/042 361/118 |
| 7,852,234 B1 * | 12/2010 | Borenstein | ................ | G08G 1/07 340/925 |
| 2008/0001782 A1 | 1/2008 | That | | |
| 2009/0073618 A1 * | 3/2009 | Wang | ..................... | H02H 9/005 361/56 |
| 2010/0265625 A1 * | 10/2010 | Montena | .................. | H01T 4/08 361/119 |
| 2013/0250469 A1 * | 9/2013 | English | ..................... | H02H 7/16 361/104 |
| 2017/0098934 A1 * | 4/2017 | Laukkanen | ............. | H02H 1/04 |

* cited by examiner

SYSTEM AND METHOD FOR PROTECTION OF ELECTRONIC BOX UNDER LIGHTNING STRIKE

CROSS REFERENCE TO RELATED APPLICATION

This application is a U.S. national phase application filed under 35 U.S.C. § 371 of International Application Number PCT/US16/65152, filed Dec. 6, 2016, designating the United States, which claim benefit of United States Provisional Application Number 62/264,083, filed Dec. 7, 2015.

STATEMENT AS TO FEDERALLY SPONSORED RESEARCH

This invention was made with government support under 12 G-005 awarded by the Federal Aviation Administration. The government has certain rights in the invention.

FIELD OF THE INVENTION

This invention relates generally to approach lighting systems, and more particularly, to preventing damage to approach lighting systems due to electrical surges.

BACKGROUND OF THE INVENTION

Airports employ many complex lighting systems that help pilots identify runways and land aircraft. For example, many airports have runway lighting systems (e.g., Runway End Identifier Lists (REIL), Runway Visual Range (RVR), etc.) and approach lighting systems (e.g., High Intensity Approach Lighting Systems with Sequence Flashing Lights (ALSF-2), Medium Intensity Approach Lighting Systems with Runway Alignment Indicator Lights (MALSR), etc. The runway lighting systems generally mark and identify runways. The approach lighting systems generally aid pilots in judging distances and positioning aircraft with respect to the runway. Approach lighting systems generally comprise light bars and/or strobe lights positioned atop of towers or posts that extend away from the runway toward the approach path of aircraft. These lights are generally referred to as "flashers." An Individual Control Cabinet (an "ICC box") controls the lights associated with the approach lighting system. For example, the ICC box provides power and control signals to the lights associated with the approach lighting system.

As with all electronics, the ICC box, lights, and wiring associated with an approach lighting system can be damaged by electrical surges. Specific to approach lighting systems, lightning strikes at the towers or posts can cause "upstream" electrical surges. These electrical surges can damage and/or destroy the ICC box, lights, and wiring associated with the approach lighting system. These problems have led to dissatisfaction with current systems.

BRIEF DESCRIPTION OF THE DRAWINGS

Embodiments of the inventive subject matter are illustrated in the figures of the accompanying drawings in which.

DETAILED DESCRIPTION

Introduction

Figure 1:
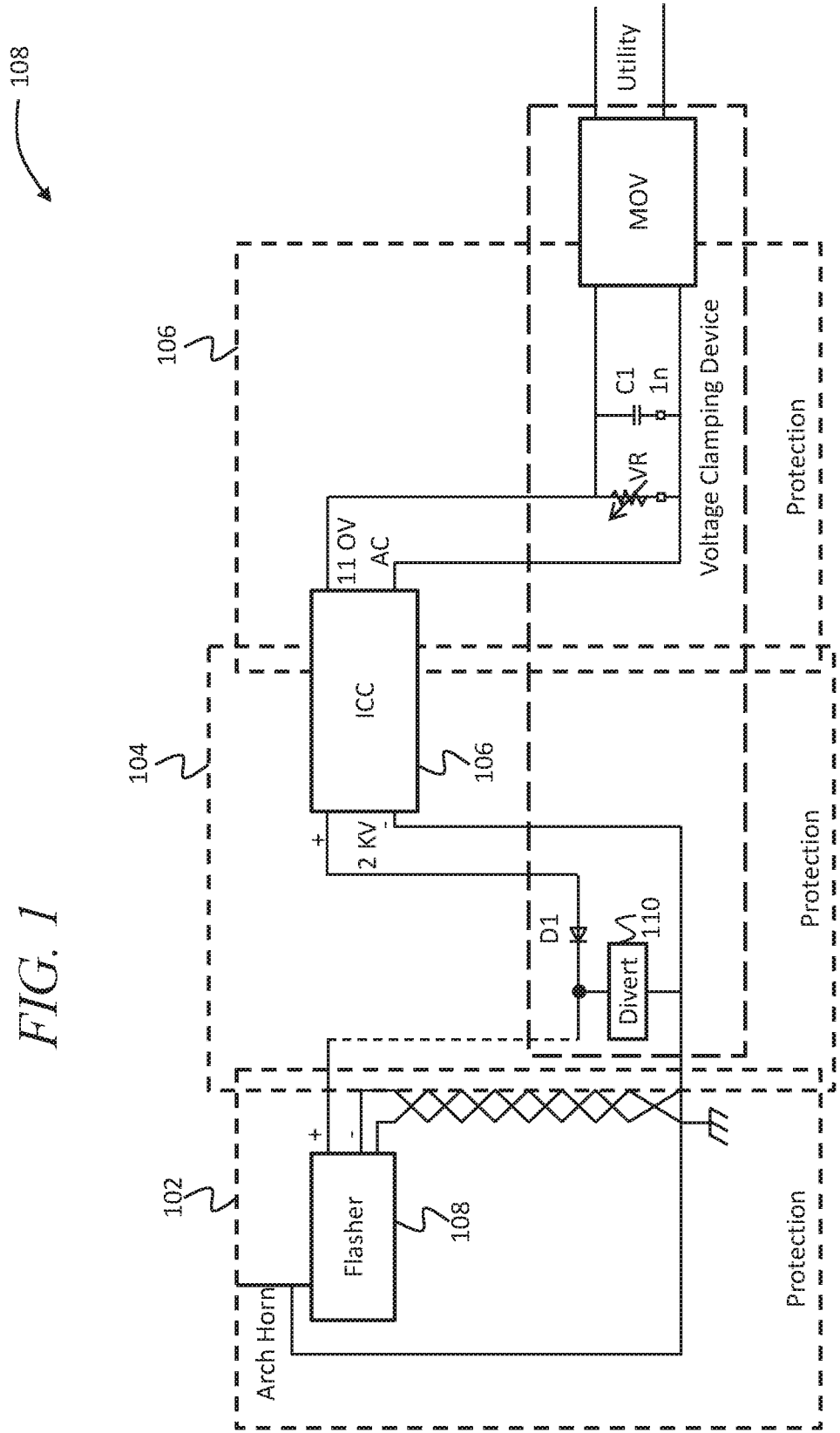
FIG. 1 is a diagram of an approach lighting system 108 having a first zone of protection 102, a second zone of protection 104, and a third zone of protection 106.

The disclosure provided by this application describes methods, systems, and apparatuses for protecting airport lighting systems from damage due to electrical surges. This disclosure includes three primary zones of protection: a first zone of protection 102, a second zone of protection 104, and a third zone of protection 106. FIG. 1 is a diagram of an approach lighting system 108 depicting the first zone of protection 102, the second zone of protection 104, and the third zone of protection 106. The first zone of protection 102 comprises aerial-based protection. The second zone of protection 104 can include an Advanced Transient Protection System (ATPS) 110 that can reduce the effects of an electrical surge on components of an approach lighting system. For example, the ATPS 110 can prevent, or reduce the likelihood, of an ICC box of an approach lighting system being damaged or destroyed. The third zone of protection 106 includes methods and apparatuses to regulate and ensure quality control of power systems.

While FIG. 1 depicts all three zones of protection, FIGS. 2-8 provide further detail about the second zone of protection and some examples of the ATPS.

Advanced Transient Protection System

Figure 2:
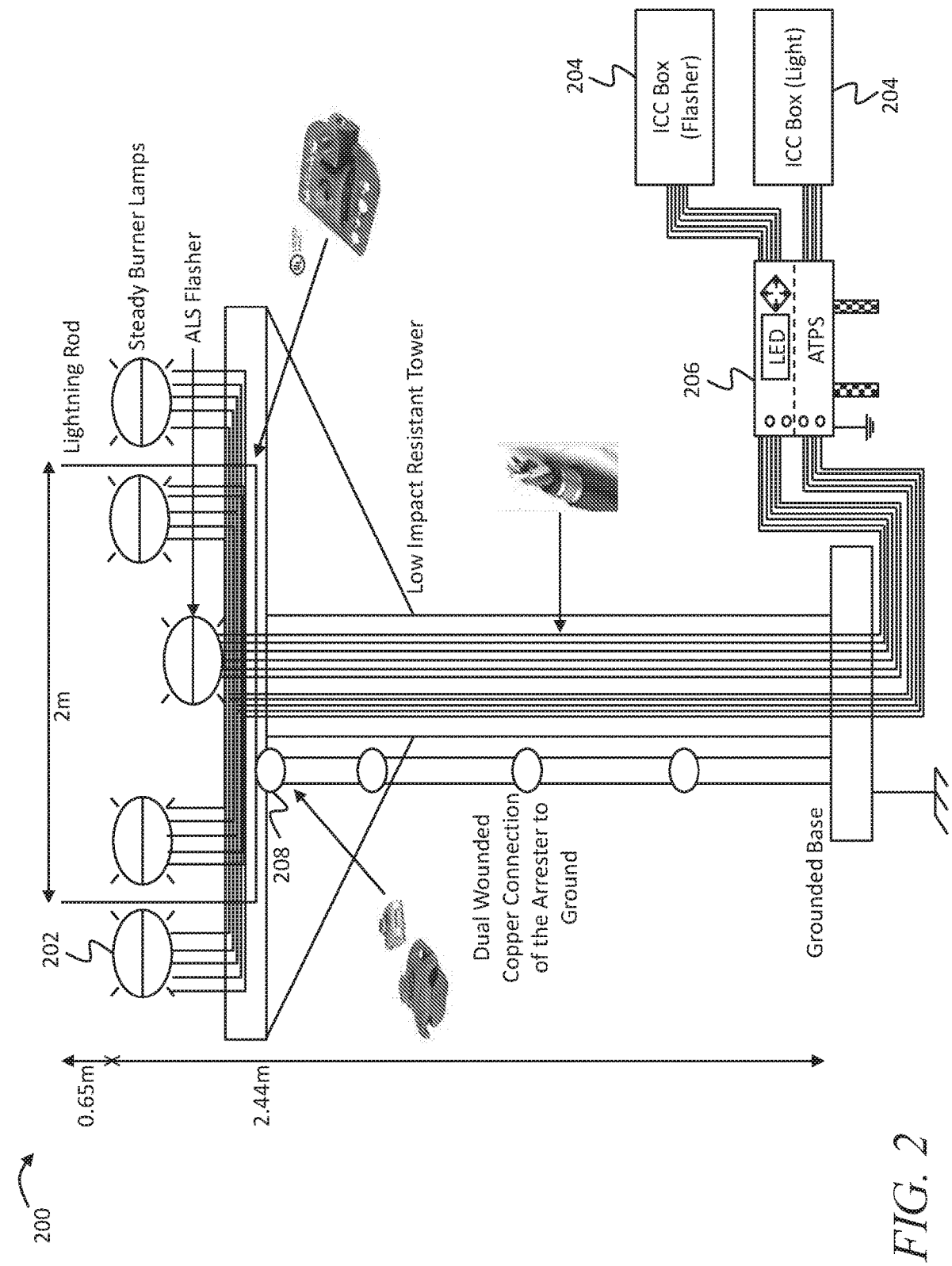
FIG. 2 is a diagram of an approach lighting system 200 including flashers 202, ICC boxes 204, and an Advanced Transient Protection System (ATPS) 206.

FIG. 2 is a diagram of an approach lighting system 200 including flashers 202, ICC boxes 204, and an Advanced Transient Protection System (ATPS) 206. The ATPS 206 provides an improved grounding and protection scheme for the approach lighting system 200. In some forms, the ATPS 206 can provide protection from electrical surges of up to 10,000V and 10,000 A. The ATPS 206 is interposed between the flashers 202 and the ICC boxes 204. Additionally, the flashers 202 and other components (e.g., lightning rods) can be grounded via a frangible cable 208.

Figure 3A:
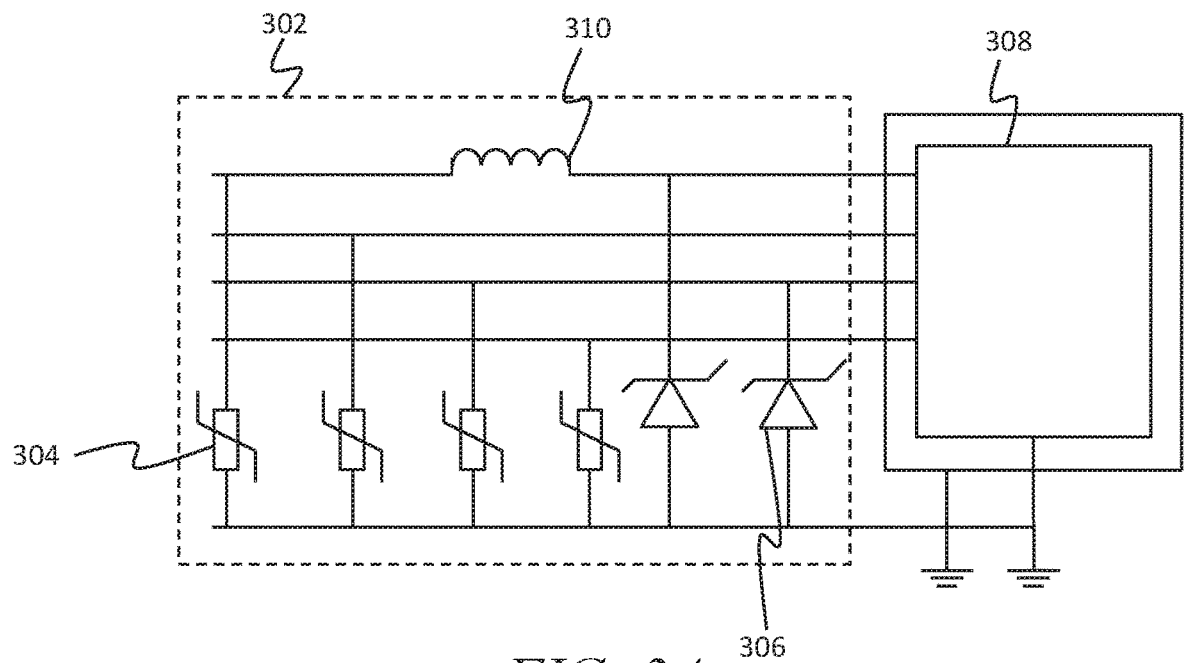
FIG. 3A depicts a one example of an Advanced Transient Protection System (ATPS) 302.

FIG. 3A depicts an example of an Advanced Transient Protection System (ATPS) 302. The ATPS 302 includes metal-oxide varistors 304, transient voltage suppressor diodes 306, and inductors 310. The ATPS 302 is electrically coupled between an ICC box 308 and the flashers (not shown). The ATPS 302 is capable of protecting the DC side of the ICC box 308 by using an integrated protection scheme. Because the ATPS 302 is electrically coupled between the ICC box 308 and the flashers, the ATPS 302 is capable of preventing electrical surges from damaging the ICC box 308, wiring associated with the approach lighting system, and other components of the approach lighting system. In some forms, the ATPS 302 is ANSI Standard C 611 Test Program compliant. The ATPS 302 depicted in FIG. 3A is designed to work with a 400V feed.

Figure 3B:
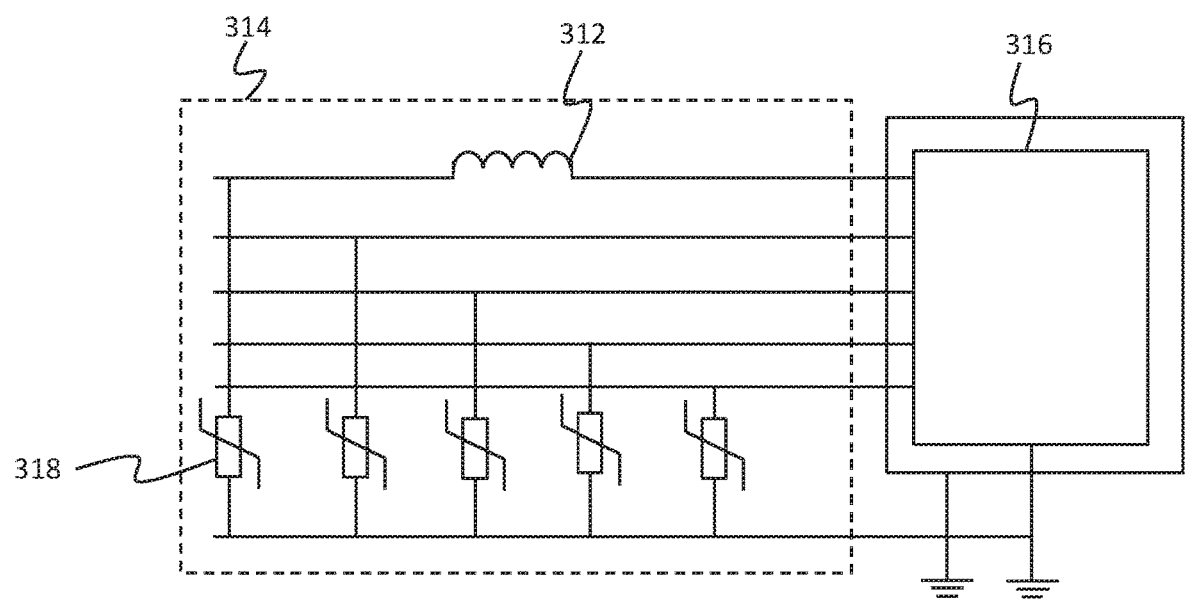
FIG. 3B depicts a second example of an Advanced Transient Protection System (ATPS) 314.

FIG. 3B depicts a second example of an Advanced Transient Protection System (ATPS) 314. The ATPS 314 includes metal-oxide varistors 318 and inductors 312. The ATPS 314 is electrically coupled between an ICC box 316 and flashers (not shown). The ATPS 314 depicted in FIG. 3B is designed to work with a 2000V feed.

Figure 4A:
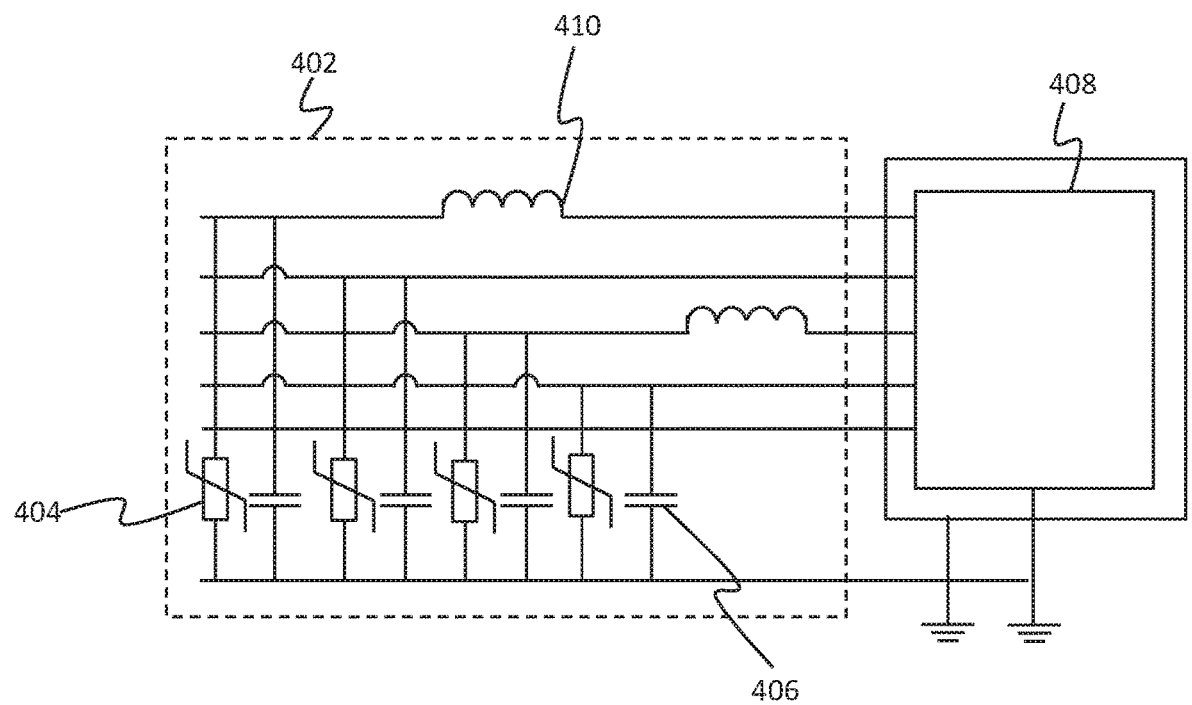
FIG. 4A depicts a third example of an Advanced Transient Protection System (ATPS) 402.

FIG. 4A depicts a third example of an Advanced Transient Protection System (ATPS) 402. The ATPS 402 includes a group of metal-oxide varistors 404. The metal-oxide varistors 404 are arranged in parallel with one or more of the connections (e.g., wires, terminals, etc.) passing through the ATPS 402. In some forms, the metal-oxide varistors 404 run to ground. The metal-oxide varistors 404 provide a path through which current can flow when a large enough potential difference exists across sides of the ATPS 402 (e.g., during an electrical surge). When a significant potential difference exists across sides of the ATPS 402, the metal-oxide varistors act as conductors and allow excess current to flow to ground, thus preventing the excess current from flowing through the ICC box 408. The ATPS 402 also includes capacitors 406 and inductors 410. The capacitors and inductors act to regulate (e.g., smooth) current flow between the ICC box 408 and the flashers. The qualities of the different components (i.e., the metal-oxide varistors 404, inductors 410, capacitors 406, and any others not pictured) can be selected based on the requirements of an application of the ATPS 402. The ATPS 402 depicted in FIG. 4A is designed to work with a 400V feed.

Figure 4B:
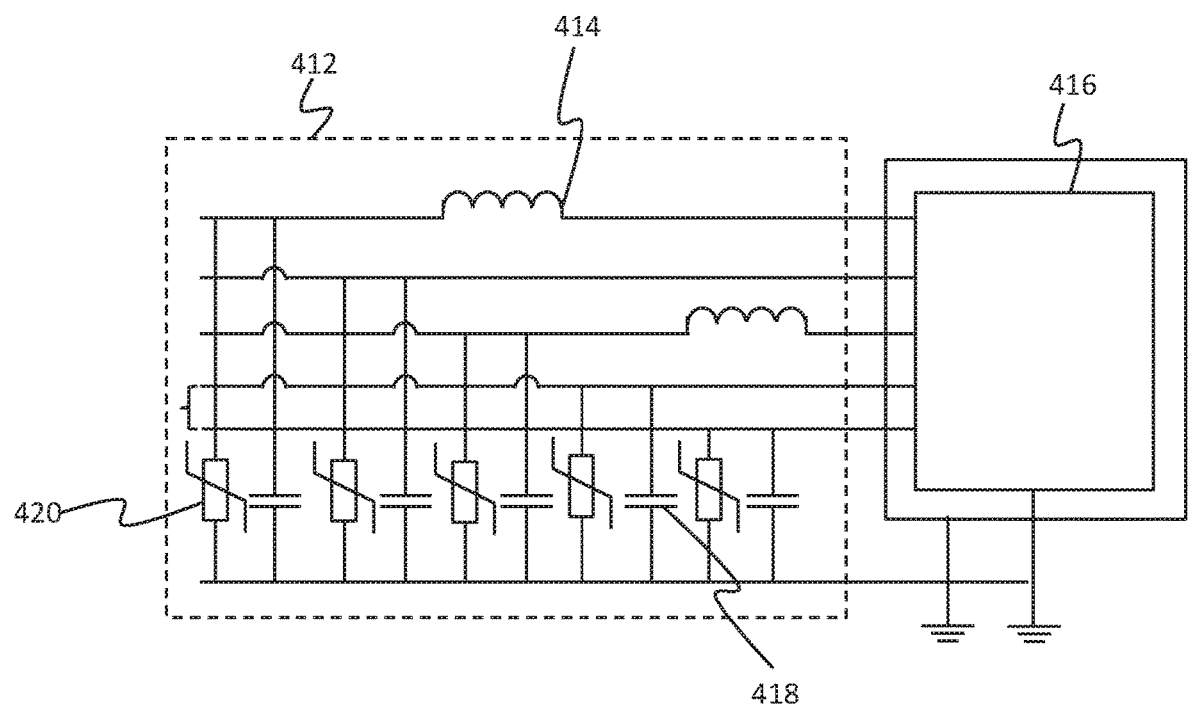
FIG. 4B depicts a fourth example of an Advanced Transient Protection System (ATPS) 412.

FIG. 4B depicts a fourth example of an Advanced Transient Protection System (ATPS) 412. The ATPS 412 includes metal-oxide varistors 420, capacitors 418, and inductors 414. The ATPS 412 is electrically coupled between an ICC box 416 and flashers (not shown) The ATPS 414 depicted in FIG. 4B is designed to work with a 2000V feed.

Figure 5A:
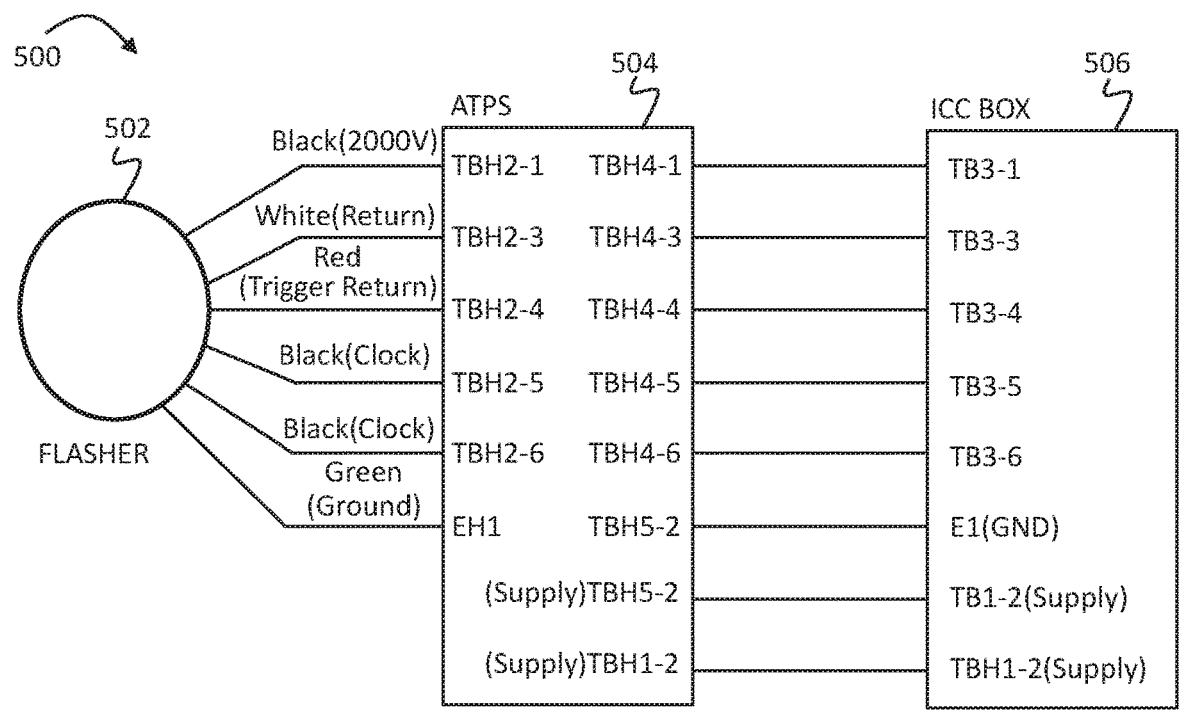
FIG. 5A depicts an approach lighting system 500.

FIG. 5A depicts an approach lighting system 500. The approach lighting system 500 includes an Advanced Transient Protection System (ATPS) 504, flashers 502, and an ICC box 506. The ATPS 504 is disposed between the flashers 502 and the ICC box 506. Numerous wires and connections pass through the ATPS 504 to the flashers 502 from the ICC box 506. For example, a 2000V feed, a return line, a trigger line, two clock lines, and a ground line pass through the ATPS 504. Because the ATPS 504 is electrically coupled between the flashers 502 and the ICC box 506, the ATPS 504 can protect the ICC box 506 (and other components of the approach lighting system) from electrical surges flowing upstream from the ATPS 504.

Figure 5B:
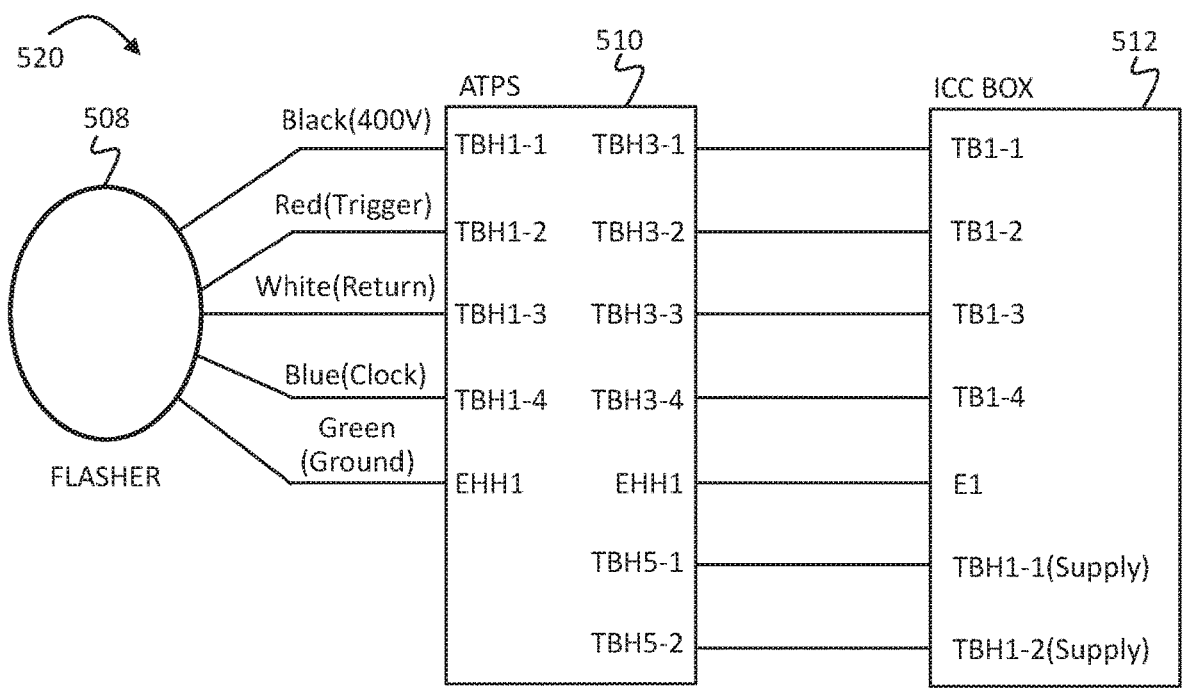
FIG. 5B depicts an approach lighting system 520.

FIG. 5B depicts an approach lighting system 520. The approach lighting system 520 includes an Advanced Transient Protection System (ATPS) 510, flashers 508, and an ICC box 512. Numerous wires and connections pass through the ATPS 510 to the flashers 508 from the ICC box 512. For example, a 400V feed, a trigger line, a return line, a clock line, and a ground line pass through the ATPS 510. Because the ATPS 510 is electrically coupled between the flashers 508 and the ICC box 512, the ATPS 510 can protect the ICC box 512 (and other components of the approach lighting system) from electrical surges flowing upstream from the ATPS 510.

Figure 6:
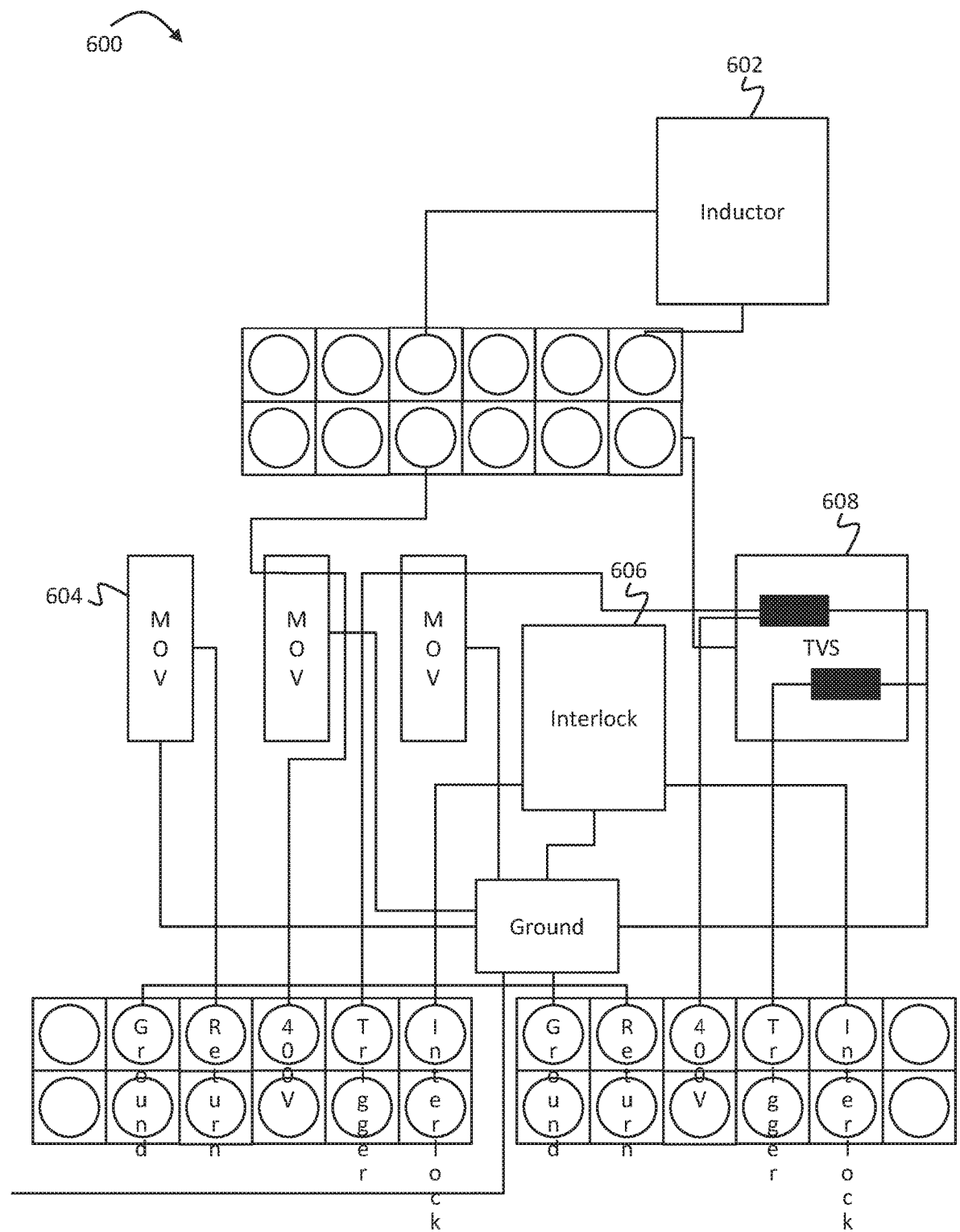
FIG. 6 depicts an example of an Advanced Transient Protection System (ATPS) 600.

FIG. 6 depicts an example of an Advanced Transient Protection System (ATPS) 600. ATPS 600 includes inductors 602, metal-oxide varistors 640, an interlock 606, and transient voltage suppressor diodes 608, among other components.

Figure 7:
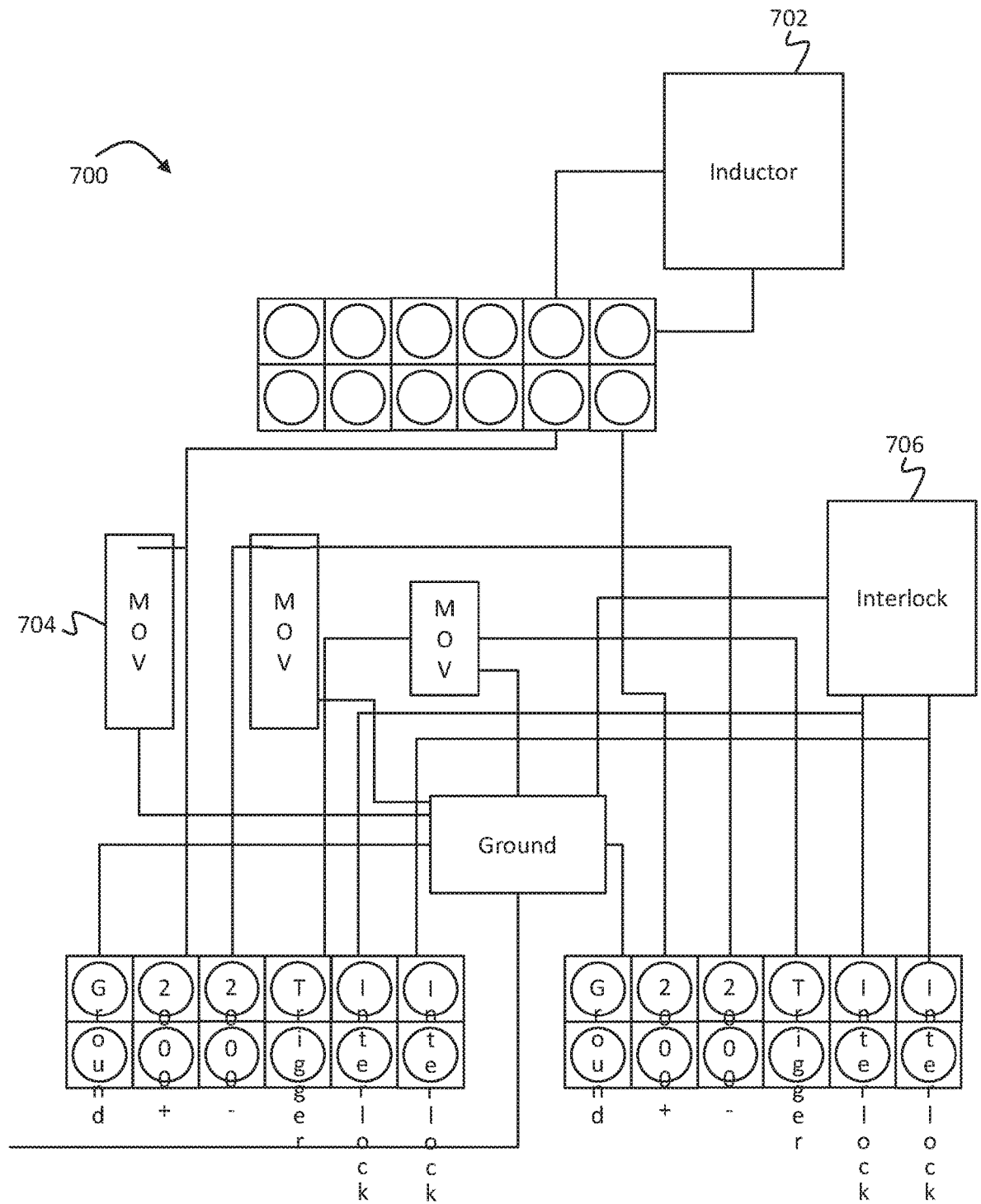
FIG. 7 depicts another example of an Advanced Transient Protection System (ATPS) 700.

FIG. 7 depicts another example of an Advanced Transient Protection System (ATPS) 700. The ATPS 700 includes inductors 702, metal-oxide varistors 704, and an interlock 706, among other components.

Figure 8:
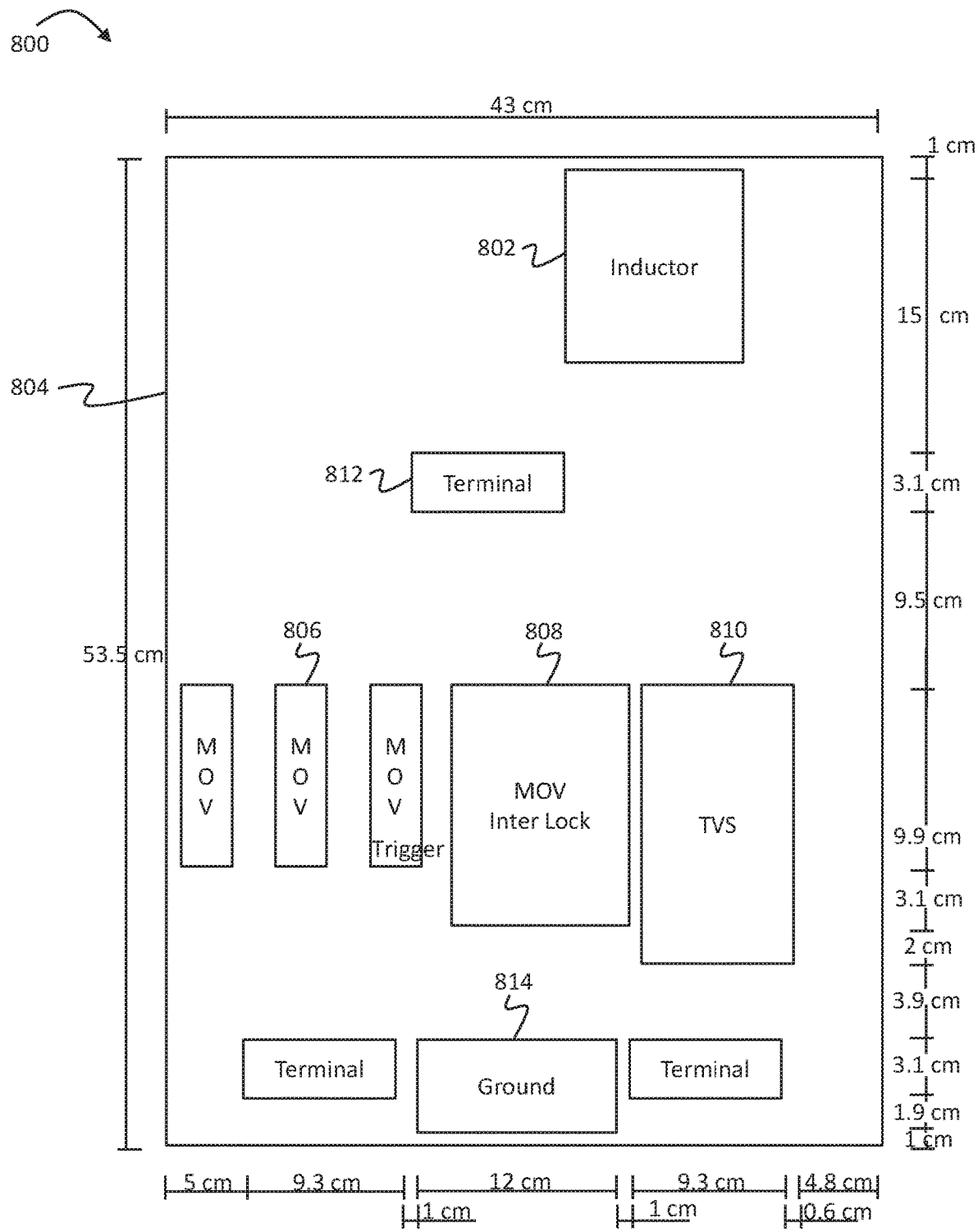
FIG. 8 is a schematic of an example Advanced Transient Protection System (ATPS) 800.

FIG. 8 is a schematic of an example Advanced Transient Protection System (ATPS) 800. The example ATPS 800 depicted in FIG. 8 includes an inductor 802, metal-oxide varistors 806, a metal-oxide varistor interlock 808, a transient voltage suppressor diode 810, terminals 812, and ground 814. FIG. 8 also includes dimensions of the example ATPS 800. The dimensions shown however are exemplary and an ATPS can be constructed having dimensions that differ from those depicted in FIG. 8.

Figure 9:
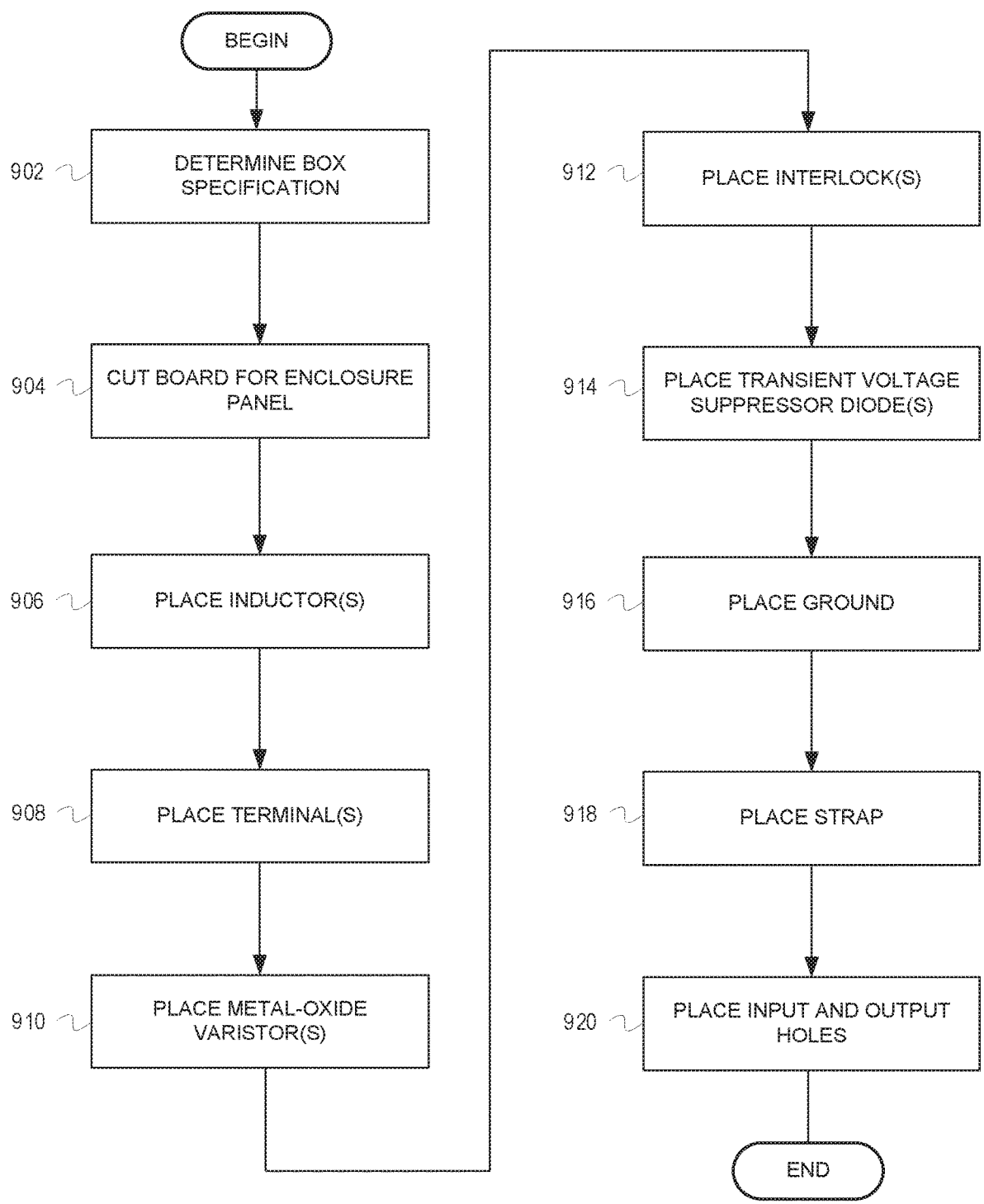
FIG. 9 is a flow chart depicting example operations for mounting, and assembly of, an Advanced Transient Protection System (ATPS).

FIG. 9 is a flow chart depicting example operations for mounting, and assembling, an Advanced Transient Protection System (ATPS). The operations depicted in FIG. 9 are example operations and the operations can differ from those depicted in FIG. 9. For example, more operations can be used, fewer operations can be used, or the operations can be performed in a sequence that differs from that depicted in FIG. 9. The flow begins at block 902.

At block 902, box dimensions are determined. Any suitable box dimensions can be used. For example, the box dimensions can the same or different than those depicted in FIG. 8. For example, the box dimensions can be 33.5 cm×43 cm. The flow continues at block 904.

At block 904, a board is cut for the inner enclosure panel. The board can be any suitable material, such as a plastic or metal board. The board can have any suitable dimensions. For example, the board can be 49.5 cm×53.34 cm×2.54 cm. The flow continues at block 906.

At block 906, the inductor(s) is placed. Any suitable number of inductors can be used. In one example, the inductors are placed using a superior plate and an inferior plate. The superior and inferior plates can take any suitable form and comprise any suitable material. For example, the superior plates can be 10.1 cm×10.1 cm×0.2 cm and be formed from acrylic and metal, and the inferior plates can be 10.1 cm×10.1 cm×0.2 cm and be formed from rubber and metal. The inductors can be placed between the four plates two-by-two and affixed using fasteners (e.g., screws, rivets, bolts, etc.). As one example, the fasteners can be positioned at the corners. The flow continues at block 908.

At block 908, the terminal(s) is placed. Any suitable number and type of terminals can be used. In one example, the terminal(s) is a strip terminal and attached to the inner enclosure panel using fasteners. The flow continues at block 910.

At block 910, the metal-oxide varistor(s) is placed. Any suitable number and type of metal-oxide varistors can be used. In one example, the metal-oxide varistor(s) is attached to the inner enclosure panel using fasteners. The flow continues at block 912.

At block 912, the interlock(s) is placed. Any suitable number and type of interlocks can be used. In one example, the interlock(s) is attached to the inner enclosure plate using fasteners. The flow continues at block 914.

At block 914, the transient voltage suppressor diode(s) is placed. Any suitable number and type of transient voltage suppressor diodes can be used. In one example, the transient voltage suppressor diode(s) is attached to the inner enclosure plate using fasteners. The flow continues at block 916.

At block 916, the ground is placed. The ground can be electrically coupled to some or all of the components of the ATPS in series or in parallel. The flow continues at block 918.

At block 918, the strap is placed. The flow continues at block 920.

At block 920, the input and output holes are placed. Any suitable number of input and output holes can be used. Additionally, the input and output holes can be placed in any suitable location.

Advantageously, an airport lighting system includes one or more lighting elements, a transient protection apparatus, and one or more electrical control cabinets is provided by the approaches described herein. The transient protection apparatus is coupled to the one or more lighting elements. One or more electrical control cabinets are coupled to the transient protection apparatus. Each of the control cabinets produces one or more of control and power signals that are effective to operate the one or more lighting elements. The transient protection apparatus is configured to provide protection for one or more of the electrical control cabinets and the one or more lighting elements from electrical surges.

In aspects, the transient protection apparatus provides protection from electrical surges of up to 10000 volts and up to 10000 amperes. Other examples are possible. In some examples, the transient protection apparatus includes varistors, diodes, and inductors. In other examples, the one or more lighting elements comprise flashers.

In some examples, the transient protection apparatus includes a plurality of varistors arranged in parallel that provide an electrical path through which current flows during an electrical surge. In still other examples, a cable that is configured to ground the one or more lighting elements is provided. In aspects, at least one of a voltage feed line, a trigger line, a return line, a clock line, and a ground line pass through the transient protection apparatus.

In other examples, an airport lighting control system includes a transient protection apparatus and one or more electrical control cabinets. The transient protection apparatus is coupled to one or more lighting elements. The one or more electrical control cabinets are coupled to the transient protection apparatus. Each of the control cabinets produces one or more of control and power signals that are effective to operate the one or more lighting elements. The transient protection apparatus is configured to provide protection for one or more of the electrical control cabinets and the one or more lighting elements from electrical surges. The transient protection apparatus is located between the one or more lighting elements and the electrical control cabinets.

In yet other examples, a transient protection apparatus is coupled between one or more lighting elements and one or more electrical control cabinets. At the one or more electrical control cabinets, one or more of control signals and power signals are produced that are sent through the transient protection apparatus. The one or more of the control signals and power signals are effective to operate the one or more lighting elements. The transient protection apparatus is configured to provide protection for one or more of the electrical control cabinets and the one or more lighting elements from electrical surges.

Although the examples described herein relate to approach lighting systems, use of the ATPS is not so limited. For example, the ATPS described herein can be used with other aviation lighting systems, non-aviation lighting systems, and any system which may benefit from protection from electrical surges.

What is claimed is:

1. An airport lighting system, comprising:
   one or more lighting elements;
   a first zone of protection, wherein the first zone of protection includes aerial-based protection;
   a second zone of protection disposed between one or more electrical control cabinets and the one or more lighting elements,
      wherein the second zone of protection includes a transient protection apparatus coupled to the one or more lighting elements,
      wherein the transient protection apparatus comprises,
         a plurality of varistors,
         a plurality of capacitors, and
      wherein the plurality of varistors and plurality of capacitors are arranged in groups, wherein each of the groups includes one of the plurality of varistors and one of the plurality of capacitors, wherein the varistor in each of the groups is arranged in parallel with the capacitor in each of the groups between ground and the one or more electrical control cabinets;
         the one or more electrical control cabinets coupled to the transient protection apparatus, each of the control cabinets producing one or more of control and power signals that are effective to operate the one or more lighting elements;
      wherein the transient protection apparatus is configured to provide protection for one or more of the electrical control cabinets and the one or more lighting elements from electrical surges,
      wherein the capacitor is a smoothing capacitor;
   a third zone of protection, wherein third zone of protection regulates and ensures quality control of power systems,
   wherein the one or more lighting elements comprise flashers, and
   wherein the lighting system further comprises a cable that is configured to ground the one or more lighting elements.

2. The lighting system of claim 1, wherein the transient protection apparatus further comprises:
   a plurality of inductors, wherein each of at least some of the groups include one of the plurality of inductors in series.

3. The lighting system of claim 1, wherein the transient protection apparatus includes varistors, diodes, and inductors.

4. The lighting system of claim 1, wherein the transient protection apparatus comprises a plurality of varistors arranged in parallel that provide an electrical path through which current flows during an electrical surge.

5. The lighting system of claim 1, wherein at least one of a voltage feed line, a trigger line, a return line, a clock line, and a ground line pass through the transient protection apparatus.

6. An airport lighting control system, comprising:
   a transient protection apparatus coupled to one or more lighting elements, wherein the transient protection apparatus is disposed between one or more electrical control cabinets and the one or more light elements,
      wherein the transient protection apparatus comprises,
         a plurality of varistors, wherein the plurality of varistors are arranged in parallel between ground and the one or more electrical control cabinets;
   the one or more electrical control cabinets coupled to the transient protection apparatus, each of the control cabinets producing one or more of control and power signals that are effective to operate the one or more lighting elements;
   wherein the transient protection apparatus is configured to provide protection for one or more of the electrical control cabinets and the one or more lighting elements from electrical surges, and wherein the transient protection apparatus is located between the one or more lighting elements and the electrical control cabinets, and wherein the airport lighting system includes a first zone of protection, a second zone of protection, and a third zone of protection, wherein the first zone of protection includes aerial-based protection, the second zone of protection includes the transient protection apparatus, and the third zone of protection regulates and ensures quality control of power systems, wherein each of the varistors is arranged in parallel with a respective capacitor, wherein the capacitor is a smoothing capacitor, wherein the one or more lighting elements comprise flashers, and wherein the airport lighting control system further comprises a cable that is configured to ground the one or more lighting elements.

7. The lighting control system of claim 6, wherein the transient protection apparatus further comprises:

a plurality of inductors, wherein each of the plurality of inductors are arranged in series with one of the plurality of varistors.

8. The lighting control system of claim 6, wherein the transient protection apparatus includes varistors, diodes, and inductors.

9. The lighting control system of claim 6, wherein the transient protection apparatus comprises a plurality of varistors arranged in parallel that provide an electrical path through which current flows during an electrical surge.

10. The lighting control system of claim 6, wherein at least one of a voltage feed line, a trigger line, a return line, a clock line, and a ground line pass through the transient protection apparatus.

11. A method of operating an airport lighting system that includes one or more lighting elements, comprising:

coupling a transient protection apparatus between the one or more lighting elements and one or more electrical control cabinets, wherein the transient protection apparatus comprises, a plurality of varistors, a plurality of capacitors, and wherein the plurality of varistors and plurality of capacitors are arranged in groups, wherein each of the groups includes one of the plurality of varistors and one of the plurality of capacitors, wherein the varistor in each of the groups is arranged in parallel with the capacitor in each of the groups between ground and one or more electrical control cabinets;

at the one or more electrical control cabinets, producing one or more of control signals and power signals that are sent through the transient protection apparatus, the one or more of the control signals and power signals being effective to operate the one or more lighting elements;

wherein the transient protection apparatus is configured to provide protection for one or more of the electrical control cabinets and the one or more lighting elements from electrical surges, wherein the airport lighting system includes a first zone of protection, a second zone of protection, and a third zone of protection, wherein the first zone of protection includes aerial-based protection, the second zone of protection includes the transient protection apparatus, and the third zone of protection regulates and ensures quality control of power systems, wherein the capacitor is a smoothing capacitor, wherein the one or more lighting elements comprise flashers, and wherein the lighting system further comprises a cable that is configured to ground the one or more lighting elements.

12. The method of claim 11, wherein the transient protection apparatus further comprises:

a plurality of inductors, wherein each of at least some of the groups include one of the plurality of inductors in series.

13. The method of claim 11, wherein the transient protection apparatus includes varistors, diodes, and inductors.

14. The method of claim 11, wherein the transient protection apparatus comprises a plurality of varistors arranged in parallel that provide an electrical path through which current flows during an electrical surge.

15. The method of claim 11, wherein at least one of a voltage feed line, a trigger line, a return line, a clock line, and a ground line pass through the transient protection apparatus.

* * * * *